United States Patent [19]

Tasior et al.

[11] 4,244,921
[45] Jan. 13, 1981

[54] CONTACT NODE OF A SYSTEM FOR PRODUCTION OF SULPHURIC ACID

[75] Inventors: Andrzej Tasior; Marian Blicharz; Józef Kania, all of Cracow; Józef Strzelski, Cracow Nowa Huta; Ignacy Kracik, Cracow, all of Poland

[73] Assignee: Przedsiebiorstwo Projektowania i Dostaw Kompletnych Obiektow Przemyslowych "Chemadex" w Warsawie, Oddzial w Krakowie, Cracow, Poland

[21] Appl. No.: 40,028

[22] Filed: May 18, 1979

[30] Foreign Application Priority Data

Jun. 1, 1978 [PL] Poland .................................. 207313

[51] Int. Cl.³ .......................... C01B 17/48; F28D 7/00
[52] U.S. Cl. ..................................... 422/161; 422/192; 422/201
[58] Field of Search ............... 422/161, 192, 201, 203, 422/218

[56] References Cited

U.S. PATENT DOCUMENTS

| | | |
|---|---|---|
| 1,857,308 | 5/1932 | Isenberg ........................... 422/201 X |
| 3,566,582 | 3/1971 | Yankura ........................... 422/218 X |
| 3,706,536 | 12/1972 | Greenwood et al. ........... 422/192 X |
| 3,944,394 | 3/1976 | McClintock et al. ............... 422/201 |

OTHER PUBLICATIONS

"Sulphur", No. 124 May/Jun. 1976, pp. 34–37, *A Radial Flow Converter for Sulphuric Acid Plants.*

Primary Examiner—William A. Cuchlinski, Jr.
Attorney, Agent, or Firm—Ladas & Parry

[57] ABSTRACT

A contact system for production of sulphuric acid of a high yield, especially of pyrite or roaster gases by means of the contact method in a system of single- or double-stage conversion consists of a number of separate contact units, each of them including one layer of a catalyst and a heat exchanger. A layer of a catalyst is in the form of a vertical cylinder, and in the space enclosed by the said layer a heat exchanger is situated. A contact apparatus is provided with a helical guide of the gas supplied onto a layer of the catalyst.

2 Claims, 3 Drawing Figures

CONTACT NODE OF A SYSTEM FOR PRODUCTION OF SULPHURIC ACID

BACKGROUND OF THE INVENTION

The subject of the invention is a contact system for production of sulphuric acid of a high yield, especially of pyrite or roaster gases by means of the contact method in a system of single-stage or double-stage conversion.

There are known and widely used in sulphuric acid plants contact nodes consisting of single, vertical, cylindrical contact units and internal or external heat exchangers of the gas-gas or liquid-gas type. The contact are provided with four or five layers of a catalyst placed on horizontal plates which are situated one above another and separated from one another by means of convex, concave or flat diaphragms.

External heat exchangers of the gas-gas type are usually jacket-pipe heat exchangers with diaphragms in the inter-pipe space, plate heat exchangers, or block heat exchangers. Polish patent specification No. 95,920; "Sulphuric acid", A guide for Engineers and Technicians, WNT, 1975.

From the U.S.S.R. patent specification No. 233,631 there are also known four-plate contact apparata with vertical layers of a catalyst, located on a horizontal diaphragm on which an internal, horizontal heat exchanger is also situated. The particular, flat, vertically arranged layers of the catalyst are inclined in relation to one another, thus forming wedge-shaped inlets and outlets of a gas.

Contact provided with internal heat exchangers of a gas-gas type are applied in experimental systems or in sulphuric acid plants of low yields, that is in such cases when dimensions of apparata and heat exchangers are not large. On the other hand, in systems of high yields only external heat exchangers are applied, because their dimensions and weights are so large that—due to design reasons—it is impossible to incorporate them inside contact apparata.

Disadvantages and drawbacks of the hitherto used contact nodes, especially in systems of high yields, consist in:

poor distribution of a gas over the whole cross-section of a plate of a contact apparatus, filtering ability of the plate, resulting in deposition of dusts contained in the gas, as well as dusts created by abrasion of the catalyst, which causes a rapid increase of the resistance of the gas flow through the plates, bar grates of the plates operate within the zone of the highest temperatures, which results in a decrease of their mechanical strength, thus limiting the dimensions of the contact apparatus, contact of the post-reaction gas with the walls of the apparatus makes it necessary to use alloy steels and to increase the quantity of design materials, this resulting in an increase of heat losses, a necessity of applying layers of quartz below and above the layer of the catalyst results in an increase of the resistance of the plates and in an increase of the load of the plates and the whole apparatus, an application of external heat exchangers of a gas-gas type leads to a considerable increase of the building site area, the number of foundations, gas pipings, steel constructions, platforms, consumption of insulating materials, etc., as well as to an increase of heat losses and resistances of the gas flow. Jacket-pipe heat exchangers with diaphragms in the interpipe space can be used at low velocities of gas in the said space and have large pitch of the pipes, resulting from high resistances of the gas flow. Therefore, the total coefficient of heat exchange in the aforesaid heat exchangers is low and is approximately $10 \div 12$ kcal/m$^2$h°C., and therefore, very large areas of heat exchange are required. This results in employing of large quantities of large heat exchangers, especially in the systems for obtaining of sulphuric acid from pyrite and roaster gases at an application of double-stage conversion.

SUMMARY OF THE INVENTION

The essence of the contact node according to the invention consists in that it employs an arbitrary number of separate contact connected functionally by means of gas pipings. Each contact apparatus has one layer of a catalyst and a heat exchanger, which are mounted in a common body. The layer of the catalyst is in the form of a vertical cylinder and is fixed directly on a foundation, whereas the heat exchanger is situated in the space enclosed by the said layer, and between the outer jacket of the heat exchanger and the layer of the catalyst an annular channel is formed designed for the flow of the gas reacted in the said layer.

The inlets of the gas supplied onto the contact layer are in the form of a helical guide fixed on the body of the contact apparatus.

Advantages of the contact node according to the invention are the following:

an increase of the utilization degree of the catalyst, due to uniform distribution of the gas over its surface, and thus a reduction of the quantity of the catalyst, easy charging and replacement of the catalyst, protection of the catalyst layers against being covered with the dust, which has been obtained due to tangent introduction of gas and to vertical positioning of the catalyst layer, obtaining of advantageous conditions of heat exchange in the internal annular exchangers a reduction of the heat exchange area, of heat losses, an increase of the gas flow velocity due to employing the outer jackets of the exchangers as heat exchange elements, elimination of diaphragms in the inter-pipe space, application of annular inlets and outlets of gas, easiness of realisation and assembling of the contact node, small area of the building site, a considerable reduction of the number of gas pipings, steel constructions, platforms, etc., an easy access to all elements of the equipment of the contact node, which facilitates its assembling, operation and repairs.

BRIEF DESCRIPTION OF THE DRAWINGS

The subject of the invention is illustrated in an example of its realisation in the drawings, where.

DETAILED DESCRIPION OF PREFERRED EMBODIMENT

Figure 1:
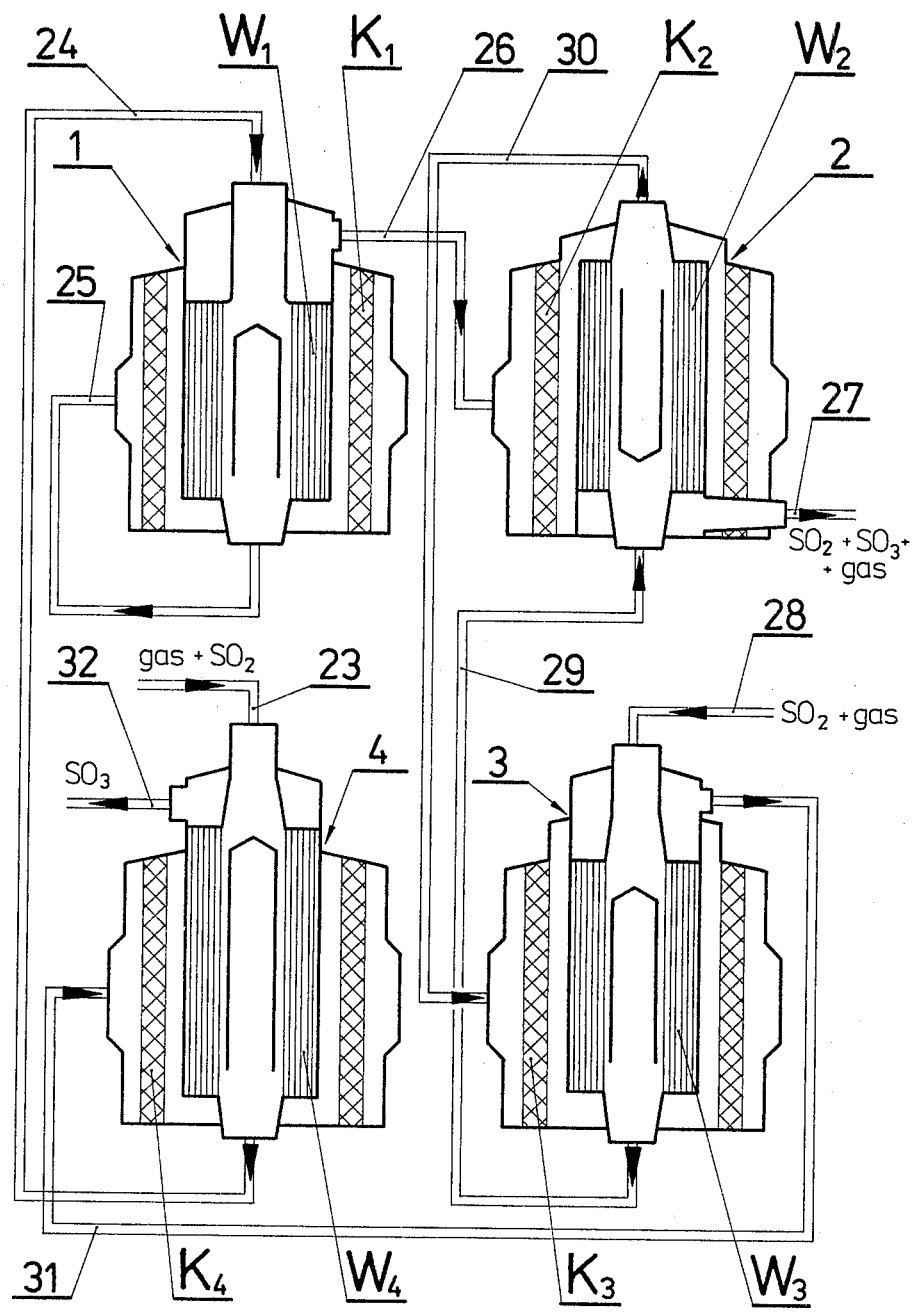
FIG. 1 shows the diagram of the contact node.

As it is shown in FIG. 1, the contact node includes four separate contact 1, 2, 3 and 4. Each apparatus has one layer of a catalyst—appropriately $K_1$, $K_2$, $K_3$, and $K_4$—and a heat exchanger—appropriately $W_1$, $W_2$, $W_3$, and W$_4$—which are placed in a common body. The contact 1, 2, 3 and 4 are connected with one another by means of gas pipings, thus forming a closed functional unit of.

Figure 2:
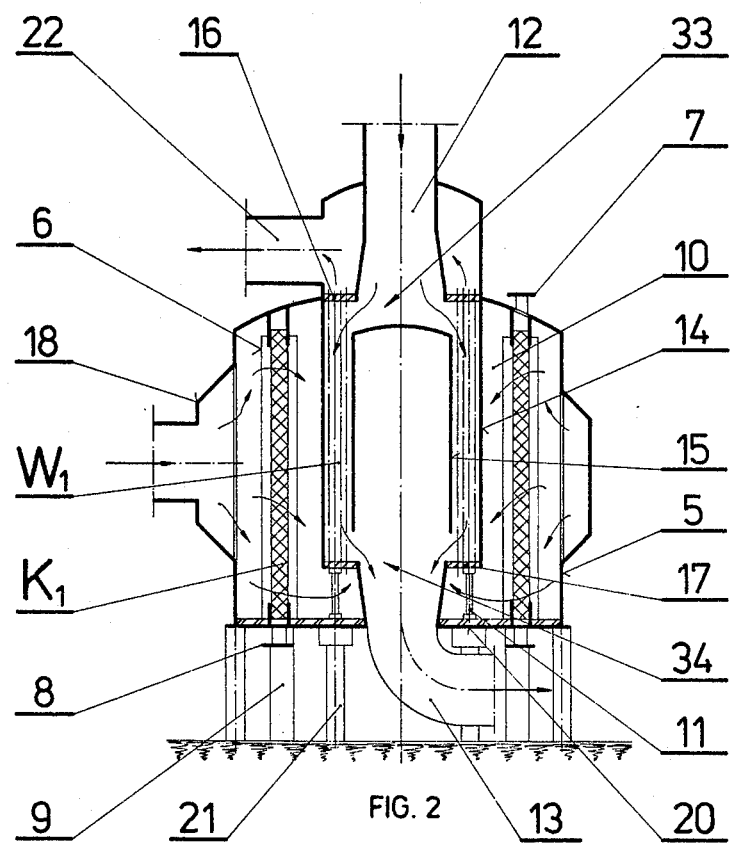
FIG. 2 shows a longitudinal section of a single-layer contact apparatus.
Figure 3:
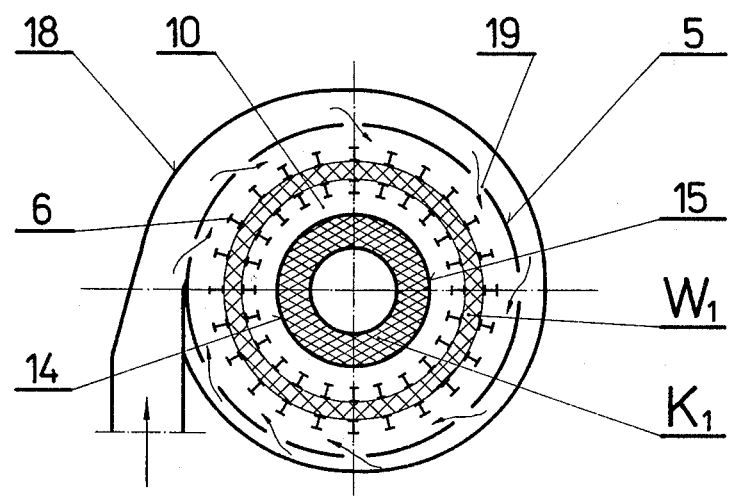
FIG. 3 shows a cross-section of the same apparatus.

A contact apparatus FIG. 2 includes a body 5, wherein a vertical, cylindrical layer of a catalyst K$_1$ and a heat exchanger W$_1$ are situated. The catalyst layer K$_1$ is supported by means of a support structure 6 consisting of steel frames and cast iron trusses covered with a steel grid not shown in the figure.

The catalyst is charged into the support structure 6 through a ferrule 7, and is discharged through a ferrule 8. The catalyst layer K$_1$ is supported directly on a foundation 9.

The heat exchanger W$_1$ is situated in a space enclosed by the layer of the catalyst K$_1$ and concentrically in relation to the said layer so that between them an annular channel 10 is formed. The exchanger W$_1$ is supported on supports 11 and is provided with a ferrule 12 of gas inflow into the inter-pipe space and with a ferrule 13 of gas outflow from the said space.

The heat exchanger W$_1$ consists of an outer jacket 14 and an inner diaphragm 15 between which there is an annular inter-pipe space closed with annular sieve bottoms: an upper bottom 16 and a lower bottom 17. The inner diaphragm 15 constitutes at the same time a guide of the gas flow.

On the body 5 a helical guide 18 of the gas supplied to the contact apparatus is situated. The flank of the body 5 is provided with holes 19 for the gas supplied onto the catalyst layer K$_1$, which are connected with the guide 18. The body 5 is closed with a bottom 20 supported on a foundation 21.

On the upper part of the body 5 there is situated a ferrule 22 of gas outflow from the pipe space of the exchanger W$_1$.

Operation of the contact node according to the invention, at an application of the gas obtained during combustion of pyrite, in a system of double-stage conversion with two contact for each stage, is, as follows.

Cooled and purified gas containing SO$_2$—its concentration being approximately 9%—is introduced via the gas piping 23 into the inter-pipe space of the heat exchanger W$_4$, and therefrom is directed—via a gas piping 24—to the inter-pipe space of the heat exchanger W$_1$. In the heat exchangers W$_4$ and W$_1$ the gas is heated to the ignition temperature of the catalyst used, then it is supplied via a gas piping 25 onto the first layer of the catalyst K$_1$, and after passing through the said layer, SO$_2$ oxidizes partially to SO$_3$. The gas containing a mixture of SO$_2$ and SO$_3$ washes the outer jacket of the exchanger W$_1$, flows through the pipes of the said exchanger wherein it cools itself, and then is directed via a gas piping 26 onto the second layer of the catalyst K$_2$ on which—in a result of a reaction—conversion of SO$_2$ to SO$_3$ increases, and then the gas flows through the pipes of the heat exchanger W$_2$, cooling itself partially, and is directed via a gas piping 27 to the first stage of absorption not shown in the drawing.

After inter-stage absorption of SO$_3$, the gas containing a remainder of SO$_2$ is introduced via a gas piping 28 to the second stage of conversion to the contact apparatus 3, and therefrom—after passing through the inter-pipe space of the heat exchanger W$_3$—is directed via a gas piping 29 to the inter-pipe space of the exchanger W$_2$. In the exchangers W$_3$ and W$_2$ the gas is heated and then, via a gas piping 30, is introduced onto the third layer of the catalyst K$_3$ on which a further conversion of SO$_2$ to SO$_3$ proceeds, then the gas flows through the pipes of the heat exchanger W$_3$, cools itself partially, and is supplied via a gas piping 31 onto the fourth layer of the catalyst K$_4$, where complete conversion of SO$_2$ to SO$_3$ occurs. Then the gas flows through the pipes of the exchanger W$_4$, cooling itself partially, and is directed via a gas piping 32 to the second stage of absorption.

Thus the complete circulation of the gas in the contact system is realised.

In the particular single-layer contact 1, 2, 3 and 4 which function as plates of the hitherto used—there occurs an adiabatic conversion of SO$_2$ to SO$_3$ in the succeeding layers of the catalyst, as well as heat exchange of a pre-reaction gas and a post-reaction gas in the heat exchangers. And so, a previously prepared gas is introduced into the contact apparatus 1 through the ferrule 12 and through an annular inlet 33 is supplied to the inter-pipe space of the exchanger W$_1$ shielded from one side with the inner diaphragm 15, and from the other side—with the outer jacket 14. As a result of heat exchange with the gas flowing in the pipes of the echanger W$_1$, the gas in the inter-pipe space is heated and via the annular gas outlet 34 and the outlet ferrule 13 is carried away from the apparatus, and then via the gas piping 25 is directed to the helical guide 18, and therefrom—through the holes 19 in the body 5—is supplied tangently and uniformly onto the whole surface of the layer of the catalyst K$_1$.

After passing through the layer of the catalyst, the gas which is partially oxidized to SO$_3$ flows through the channel 10, undergoing partial cooling in a result of heat exchange through the outer jacket 14, and then undergoes further cooling while flowing through the pipes of the heat exchanger W$_1$.

The gas thus reacted and cooled is carried away from the apparatus through the ferrule 22, and then is directed via the appropriate gas pipings to the succeeding in the contact system.

In a result of whirling of the gas in the helical guide 18, the dusts appearing in the gas are separated.

The catalyst is charged into the apparatus through the ferrules 7 and discharged through the ferrules 8.

The operation of the contact apparatus 1 as described above herein relates also to the other in the contact node, and design and functional differences consist in changes of supplying and carrying away of the gas to and from heat exchangers, as well as in the location of the inner diaphragm 15 and the outlet gas ferrule 22, the said location being connected with the aforesaid changes.

The contact node according to the invention can be also applied in a system for production of sulphuric acid of sulphur.

The heat exchangers W$_1$, W$_2$, W$_3$, W$_4$ applied in the contact 1, 2, 3, 4 can be made of separate segments forming—in accordance with abilities of realisation and assembly—units of pipes and sieve bottoms, rigidly connected with one another, for instance, by means of welding at the assembly site of the apparatus.

What is claimed is:

1. In a high capacity converter plant for the production of sulphuric acid, by means of a contact method in a conversion system of up to two-stages, and having separate contact units connected operatively with conduit means, the improvements which are characterized in that each contact apparatus comprises: an independent integral unit accommodated in a housing means having an outer cylindrical wall with openings therein, one cylindrical catalyst layer mounted on a support and defining an annular space therein, one heat exchanger means having a generally tubular shape, mounted on a separate support and positioned concentrically within the space defined by the catalyst layer, and forming therewith an annular gas duct means therebetween, said heat exchanger means having an inner wall and an outer jacket exposing said annular duct means to a heat exchange relation as gases pass from said catalyst layer through said duct means, and gas inlet guide means for supplying gas to the catalyst layer, said gas inlet means substantially completely surrounding said housing means and formed in a generally spiral shape, said outer cylindrical wall of said housing means having said openings spaced apart over the whole circumference thereof for introduction of inlet gases to the cylindrical catalyst layer and for radially inward flow therethrough, whereby the reaction gases at lowest temperatures contact the outer cylindrical wall while gases at highest temperatures contact the inner wall of said heat exchanger means.

2. The apparatus of claim 1, wherein said heat exchanger means is provided with an inner wall diaphragm which comprises both an inlet means and outlet means for postreaction gases into the generally tubular space defined by said heat exchanger means.

* * * * *